(12) United States Patent
Stenmark et al.

(10) Patent No.: US 8,296,473 B2
(45) Date of Patent: Oct. 23, 2012

(54) COMPONENT CONNECTOR WITH IDENTIFYING CHARACTERISTIC FOR AN ELECTRONIC DEVICE

(75) Inventors: Fredrik Stenmark, Kitchener (CA); Antanas Broga, Cambridge (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/327,502

(22) Filed: Dec. 15, 2011

(65) Prior Publication Data

US 2012/0088408 A1  Apr. 12, 2012

Related U.S. Application Data

(63) Continuation of application No. 12/394,192, filed on Feb. 27, 2009, now Pat. No. 8,103,807.

(51) Int. Cl.
*G06F 3/00* (2006.01)
(52) U.S. Cl. ........................................................ 710/15
(58) Field of Classification Search .................. None
See application file for complete search history.

(56) References Cited

U.S. PATENT DOCUMENTS

2009/0007705 A1 * 1/2009 McLean et al. ................. 73/865

OTHER PUBLICATIONS

Stone et al., A Deforming Sensing Surface for Evaluation of Contact Conditions, 1998, IEEE, pp. 1735-1737 (1-3).*

* cited by examiner

*Primary Examiner* — Chun-Kuan Lee
*Assistant Examiner* — Dayton Lewis-Taylor
(74) *Attorney, Agent, or Firm* — Novak Druce + Quigg LLP

(57) ABSTRACT

A system and method for optically identifying a component coupled to an electronic device is provided. The method includes emitting light from within the device toward a surface of a component connector inserted into a receiving socket of the device. A light sensor senses the intensity, amplitude or wavelength of light reflected from a surface of the component connector. A processor of the device identifies the component based on the intensity, amplitude or wavelength of light reflected from a surface of the component connector. The processor modifies at least one setting of the electronic device in response to the identification of the component.

16 Claims, 7 Drawing Sheets

COMPONENT CONNECTOR WITH IDENTIFYING CHARACTERISTIC FOR AN ELECTRONIC DEVICE

CROSS-REFERENCE TO RELATED APPLICATION

This application is a continuation of U.S. application Ser. No. 12/394,192, filed Feb. 27, 2009. U.S. application Ser. No. 12/394,192 is fully incorporated by reference herein.

FIELD OF TECHNOLOGY

The present application relates to the field of handheld electronic devices. Specifically, the present application relates to systems and methods for identifying a component inserted into a component receiving socket of an electronic device and optimizing settings of the electronic device in response to the identification of the component.

BACKGROUND

With the proliferation of more robust wireless communications systems, advancements of wireless handheld electronic devices are becoming more feasible. Handheld electronic devices can provide a variety of functions including, for example, telephonic, electronic messaging and other functions. Handheld electronic devices include mobile stations such as simple cellular telephones, smart telephones, wireless PDAs, and laptop computers.

As such electronic devices decrease in size, they are often coupled with other components to increase their functionality. For example, audio headsets can be attached to allow a user to listen to music, watch movies with sound, or otherwise receive audio output from the electronic device. Additionally, the electronic device can be coupled to a projector, monitor, keyboard, chargers, data cables and the like. It is desirable to allow users greater flexibility when implementing such components in conjunction with the electronic device.

BRIEF DESCRIPTION OF THE DRAWINGS

Embodiments of the present application will now be described, by way of example only, with reference to the attached Figures, wherein.

DETAILED DESCRIPTION

Figure 1:
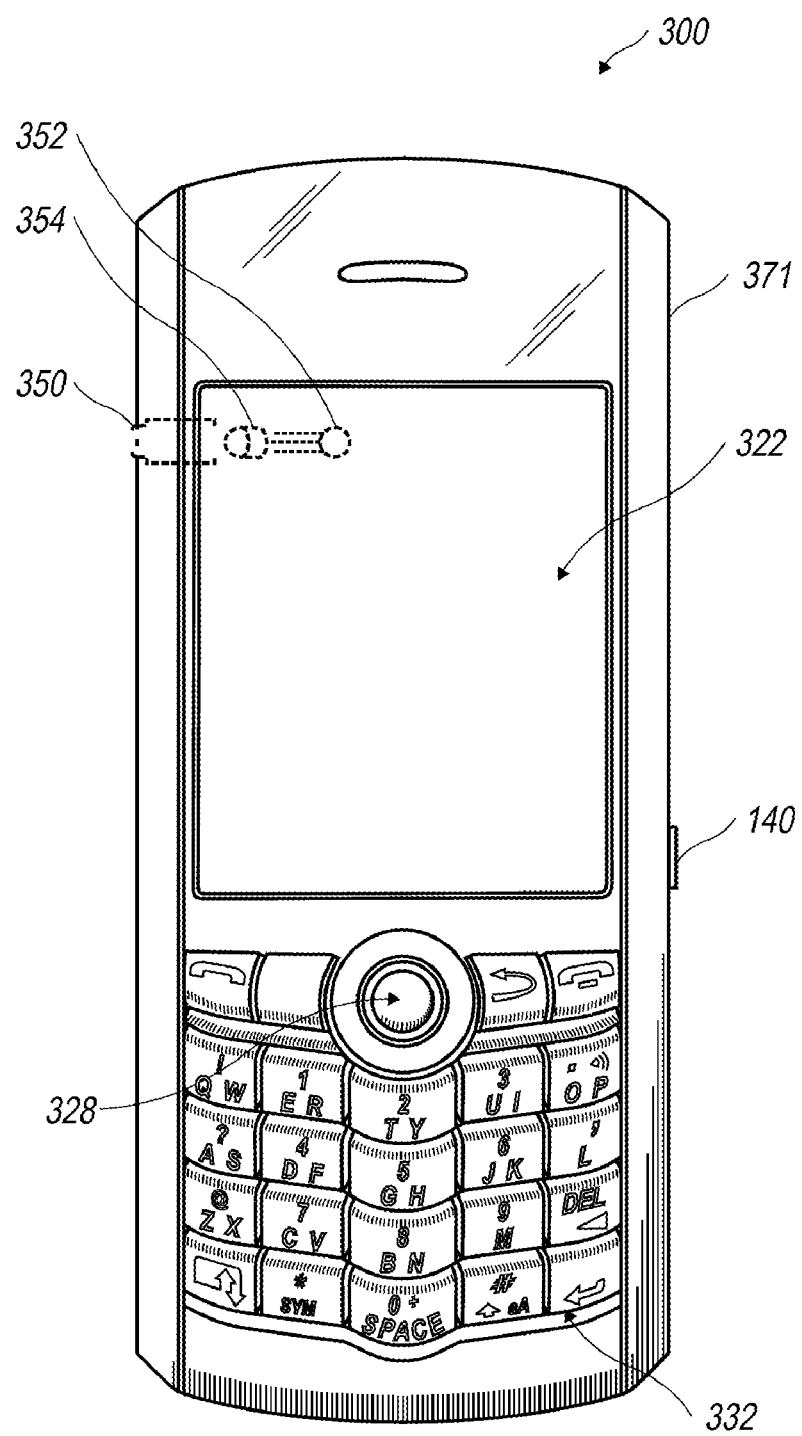
FIG. 1 illustrates an example electronic device according to the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein. The description is not to be considered as limiting the scope of the embodiments described herein.

Figure 2:
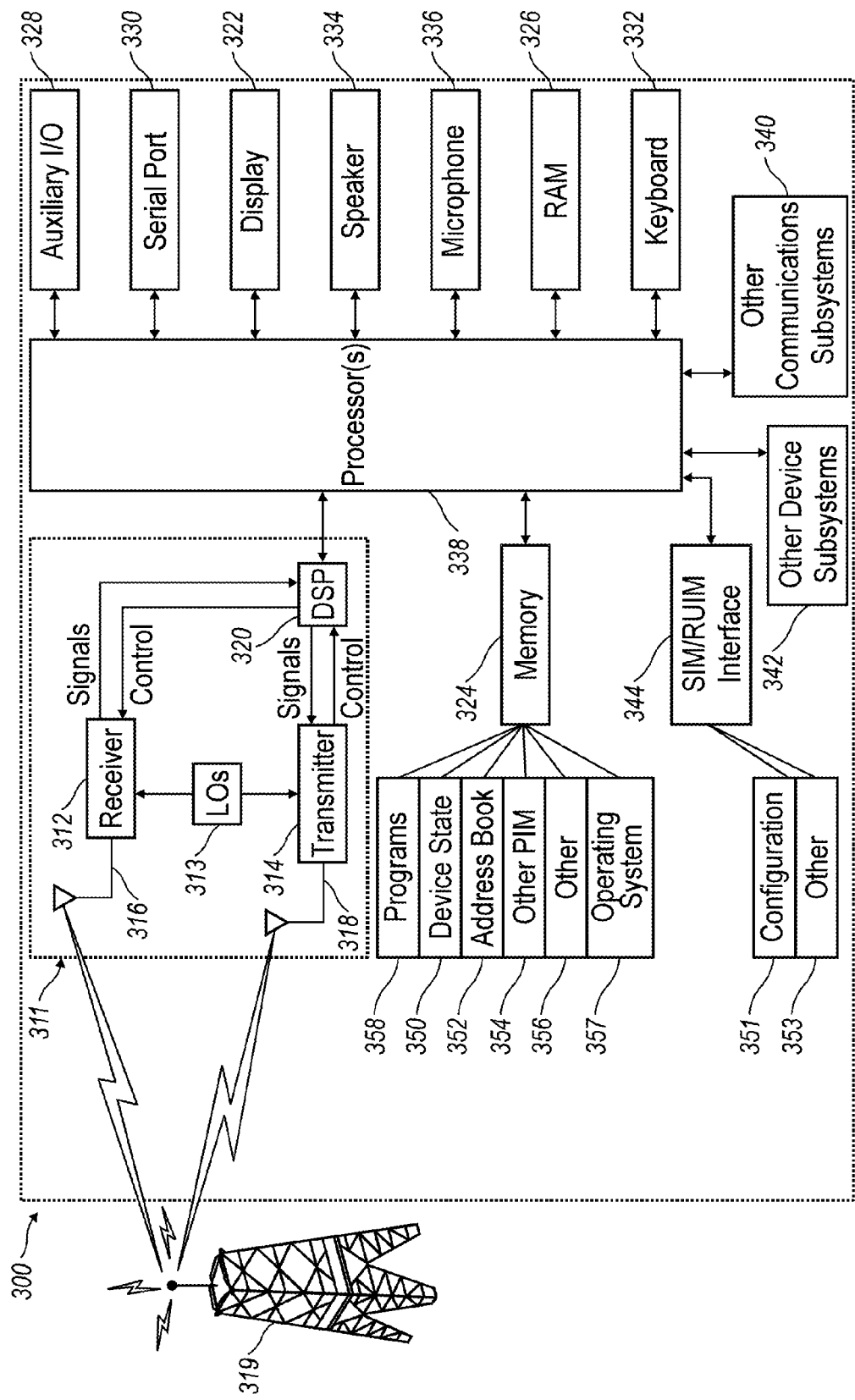
FIG. 2 is a block diagram representing an example electronic device interacting in a communication network.

An example electronic device 300 is shown in FIG. 1, and the device's cooperation in a wireless network 319 is exemplified in the block diagram of FIG. 2. The embodiment depicted in the figures are provided for example and illustration purposes only, and those persons skilled in the art will appreciate the additional elements and modifications necessary to make the electronic device 300 operable in particular network environments. While in the illustrated embodiment, the electronic device 300 includes a handheld communication device, in other embodiments, the electronic device 300 may comprise a handheld electronic device, handheld wireless communication device, a personal digital assistant (PDA), laptop computer, desktop computer, a server, or other communication device.

As shown in the block diagram of FIG. 2, the electronic device 300 includes a processor 338, which in at least one embodiment is a microprocessor that controls the operation of the electronic device 300. A communication subsystem 311 performs all communication transmission and reception with the wireless network 319. The processor 338 is coupled to an auxiliary input/output (I/O) subsystem 328 which is coupled to the device 300. Additionally, in at least one embodiment, the processor 338 is coupled to a serial port (for example, a Universal Serial Bus port) 330 that facilitates communication with other devices or systems via the serial port 330. A display 322 is coupled to processor 338 to display information to an operator of the device 300. When the electronic device 300 is equipped with a keyboard 332, which may be physical or virtual, the keyboard 332 is coupled to the processor 338. The electronic device 300 includes a speaker 334, a microphone 336, random access memory 326 (RAM), and memory 324, all of which may be coupled to the processor 338. The device 300 may include other similar components that are optionally coupled to the processor 338. Other communication subsystems 340 and other device subsystems 342 are generally indicated as being functionally coupled to the processor 338. An example of a communication subsystem 340 is a short range communication system such as BLUETOOTH® communication module or a WI-FI® communication module (a communication module in compliance with IEEE 802.11a/b/g). These subsystems 340 and their associated circuits and components can be functionally coupled to the processor 338. Additionally, the processor 338 is able to perform operating system functions and enables execution of programs on the electronic device 300. In some embodiments the electronic device 300 does not include all of the above components. For example, in at least one embodiment the keyboard 332 is not provided as a separate component and is instead integrated with a touch-sensitive display.

Furthermore, the electronic device 300 is equipped with components to enable operation of various programs, as shown in FIG. 2. In an exemplary embodiment, the memory 324, which in at least one embodiment is flash memory, is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 357 through a user interface usually including the keyboard 332 and display screen 322. While in an exemplary embodiment the operating system 357 is stored in memory 324, the operating system 357 in other embodiments is stored in read-only memory (ROM) or similar storage elements (not shown). As those skilled in the art will appreciate, the operating system 357, device program 358 or parts thereof may be loaded in RAM 326 or other volatile memory.

In one exemplary embodiment, the memory 324 contains programs 358 for execution on the electronic device 300 including an address book 352, a personal information manager (PIM) 354, and the device state 350. Furthermore, programs 358 and other information 356 including data can be segregated upon storage in the memory 324 of the electronic device 300.

When the electronic device 300 is enabled for two-way communication within the wireless communication network 319, it sends and receives signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 300 may require a unique identifier to enable the electronic device 300 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in a multitude of different electronic devices 300. The electronic device 300 can operate some features without a SIM/RUIM card, but a SIM/RUIM card is necessary for communication with the network 319. A SIM/RUIM interface 344 located within the electronic device 300 allows for removal or insertion of a SIM/RUIM card (not shown). The SIM/RUIM card features memory and holds key configuration 351, and other information 353 such as identification and subscriber related information. With a properly enabled electronic device 300, two-way communication between the electronic device 300 and communication network 319 is possible.

If the electronic device 300 is enabled as described above or the communication network 319 does not require such enablement, the two-way communication enabled electronic device 300 is able to both transmit and receive information from the communication network 319. The transfer of communication can be from the device 300 or to the device 300. In order to communicate with the communication network 319, the electronic device 300 in the presently described exemplary embodiment is equipped with an integral or internal antenna 318 for transmitting signals to the communication network 319. Likewise the electronic device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the electronic device 300.

When equipped for two-way communication, the electronic device 300 includes a communication subsystem 311. As is understood in the art, this communication subsystem 311 supports the operational needs of the electronic device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the electronic device 300 with the wireless network 319 is any type of communication that both the wireless network 319 and electronic device 300 are enabled to transmit, receive and process. In general, these can be classified as voice and data. Voice communication generally refers to communication in which signals for audible sounds are transmitted by the electronic device 300 through the communication network 319. Data generally refers to all other types of communication that the electronic device 300 is capable of performing within the constraints of the wireless network 319.

Example device programs that depend on such data include email, contacts and calendars. For these device programs, synchronization with home-based versions of the programs is desirable for either or both of their long term and short term utility. As an example, emails are often time sensitive, so substantially real time synchronization may be desired. Contacts, on the other hand, are usually updated less frequently without inconvenience. Therefore, the utility of the electronic device 300 is enhanced when connectable within a communication system, and when connectable on a wireless basis to a network 319 in which voice, text messaging, and other data transfer are accommodated.

While the above description generally describes the systems and components associated with a handheld electronic device, the electronic device 300 can be another communication device such as a PDA, a laptop computer, desktop computer, a server, or other communication device. In those embodiments, different components of the above system might be omitted in order to provide desired operability of device 300. Additionally, other components not described above may be required to allow the device 300 to function in a desired fashion. The above description provides only general components and additional components may be required to enable system functionality. These systems and components would be appreciated by those of ordinary skill in the art.

An exemplary handheld electronic device 300 is depicted in FIG. 1. The device 300 includes a body 371 housing a lighted display 322, a navigational tool (auxiliary input) 328, a keyboard 332 suitable for accommodating textual input, a receiving socket 350 for accommodating insertion of a component (not shown), a light source 352 and a light sensor 354. The device 300 of FIG. 1 is of unibody construction, but common "clamshell" or "flip-phone" constructions are also suitable for the embodiments disclosed herein. The display 322 is located above the keyboard 332. The navigational tool (auxiliary input) 328 is located essentially between the display 322 and the keyboard 332. The keyboard 332 comprises a plurality of keys with which alphabetic letters are associated, but at least a portion of the individual keys have multiple letters associated therewith. This type of configuration is referred to as a reduced keyboard (in comparison to the full keyboard having only one letter per key) and can, among others come in QWERTY, QWERTZ, AZERTY, and Dvorak layouts.

Figure 3:
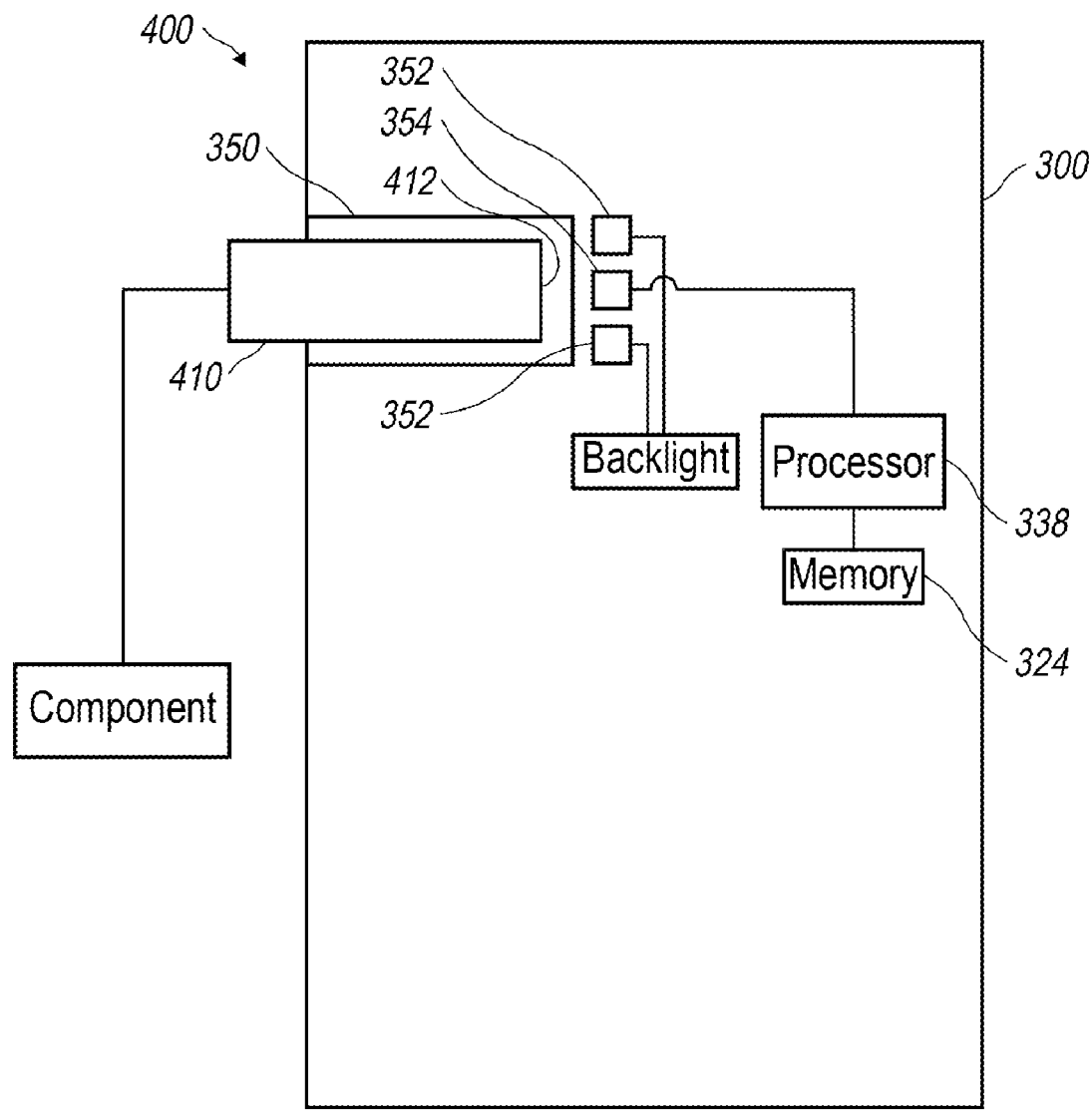
FIG. 3 is a block diagram of an example electronic device according to the present disclosure including a component.

A block diagram example of an electronic device 300 and a component 400 coupled to the electronic device 300 is illustrated in FIG. 3. A receiving socket 350 is configured such that is at least partially within the body of the electronic device 300. In at least one embodiment, the receiving socket 350 can extend beyond the body of the electronic device 300. A light source 352 which emits light into the receiving socket 350 is provided. The light source can be coupled to a backlight or other light source as well. The light source 352 can be individual light emitting diodes as well. In other embodiments, the light source 352 can form a ring around the light sensor 354. In yet another embodiment, the light source 352 can be a laser. The light sources 352 can also be controlled from the processor 338. The light sensor 354 is coupled to the processor 338. The light sensor 354 is configured to detect reflected light from at least one surface of a component connector 410 inserted into the receiving socket 350. The microprocessor can be configured to identify a component 400 based on a stored reflected light profile associated with the identity of the component 400.

As explained below, the identification of the component 400 can be based upon at least one of the detected amplitude of the reflected light, the detected wavelength of reflected light, and the detected intensity of the reflected light. The identification can be based on surface properties of the component connector 410. The amplitude of reflected light can depend on the surface characteristics of the component connector 410, the location and angle of the source relative to the component connector 410, and the location and angle of the detector relative to the component connector 410. For instance, a component connector 410 could be configured with a surface finish, for example colored paint, that identifies it relative to other component connectors. Other surface finishes that are contemplated include but are not limited to glossy paint and flat paint, which can in at least one embodiment be used in connection with a paint color. Additionally, the surface finish can be a mirror like or specular finish that will produce a narrow angular reflection in contrast to a granular, diffuse or lambertian surface which reflects light at a wider angle. Alternatively or in addition, the component connector 410 can have a surface shape that differs, for example a crowned distal end as compared to a flat distal end, from other component connectors. The distal end with a crown shape reflects light differently than the flat surface owing to its geometry. Additionally, the length of the component connector 410 can be varied to reflect light with a different amplitude which can be in turn detected according to the present disclosure. In some embodiments, only one of the above described changes to the component connector 410 is made. While in other embodiments, the component connector 410 can be modified with one or more of the above described characteristics.

The microprocessor 338 can adjust a setting of the electronic device in response to identification of the component 400. The settings that are adjusted can depend on the type of component 400 that is coupled to the electronic device 300.

The description below provides an example in relation to an audio headset. In other embodiments, the component could be one of a microphone, display screen, keyboard, touch pad, mouse, input device, speakers, audio sound system, and the like. Each of these different components 400 have settings that can be adjusted on the electronic device 300 to increase the user experience. For example, a display screen can have a native resolution, which can be adjusted to match the display properties. In the example of a keyboard, different configurations of keys can be implemented. In the case of speakers and audio sound systems the levels of output sound can be adjusted. Output sound can be adjusted through an equalizer setting where ranges of sounds are adjusted or it can be limited to treble, bass, and mid-range.

Figure 4A:
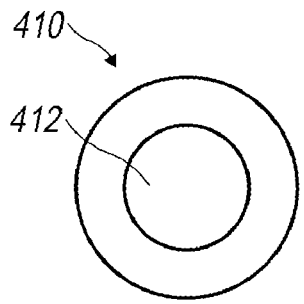
FIGS. 4A-E illustrate an end view of component connector and associated textures and colors.
Figure 4B:
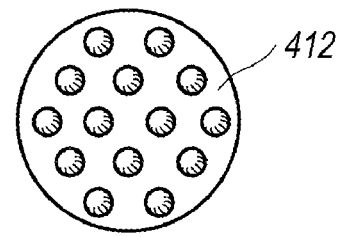
Figure 4C:
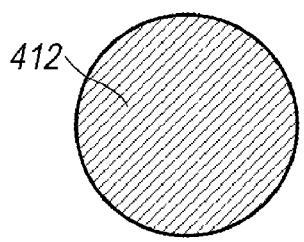
Figure 4D:
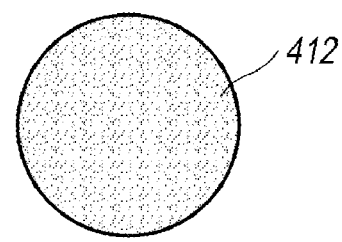
Figure 4E:
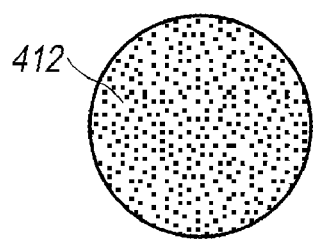

In order to provide reflected light from the component connector 410 that can be distinguished, the distal end 412 of the component connector 410 can have a surface that is unique. As described above, the identification of the component can be based upon at least one of the detected amplitude of the reflected light, the detected wavelength of reflected light, and the detected intensity of the reflected light. In order to illustrate some examples in FIGS. 4A-E have been provided. In FIG. 4A, an end view of the distal end 412 is provided. As illustrated the distal end 412 is smaller in diameter than the component connector 410. The distal end 412 can be colored with a specific color to reflect the light with a unique characteristic. Also the surface of the distal end 412 can have a predetermined texture. For instance in FIG. 4B, the predetermined texture is a series of raised bumps. In FIG. 4C, the surface texture is one that features a series of peaks and troughs. In FIG. 4D, the surface is a dark color such that it absorbs most of the light emitted upon it. In FIG. 4E, the surface has a pattern that allows for some absorption as well as reflection. These and other similar patterns can be implemented on the surface of the distal end 412 to provide for identification of the coupled component 400. In other embodiments, the texture can be described as one of granular and smooth. For instance, the surface of FIG. 4E can be described as granular, whereas the surface of FIG. 4D can be described as smooth.

Figure 5:
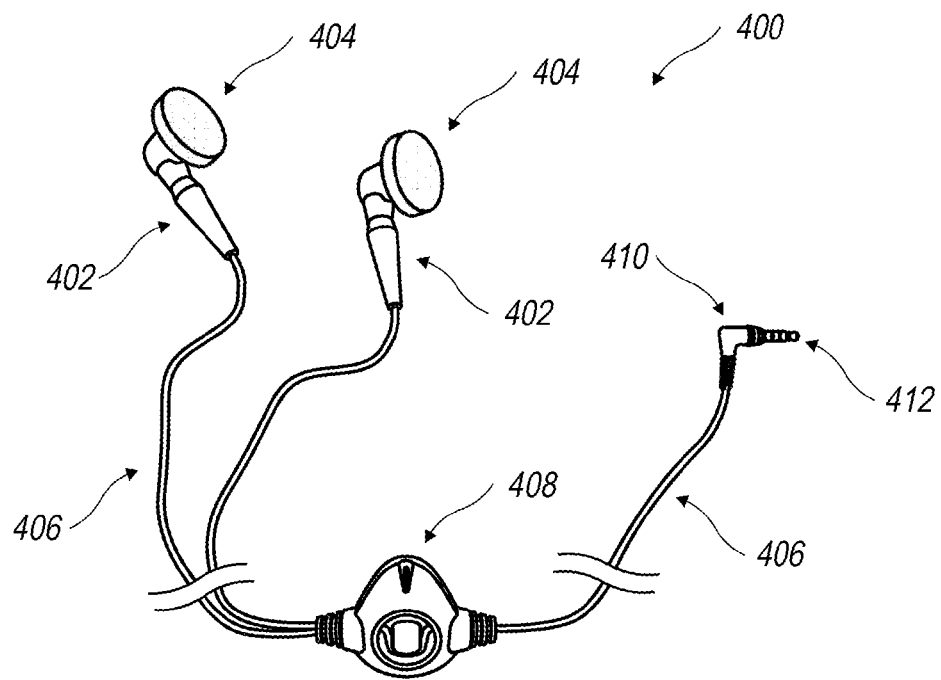
FIG. 5 illustrates an example audio headset including a male jack, microphone and audio driver.
Figure 6:
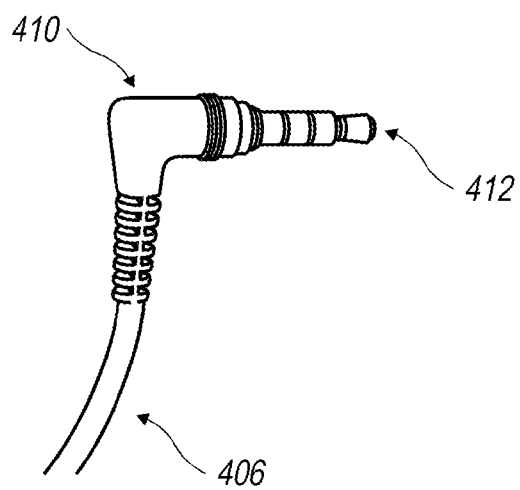
FIG. 6 illustrates a male jack of an example audio headset according to the present disclosure.

In one embodiment illustrated in FIG. 5, the component 400 is an audio headset including at least one driver support frame 402, at least one audio driver 404, at least one driver cable 406, a microphone 408 and a component connector 410, a male jack as illustrated, having a distal end 412. The cable 406, through which audio electrical signals are received and transmitted, extends from the audio drivers 404 through the microphone 408 and attaches to the component connector 410, as shown in FIG. 6. Audio electrical signals are received from that electronic device 300 and output through the audio drivers 404. The microphone 408 illustrated in FIG. 5, allows audio electrical signals that are created by a user to be captured. The distal end 412 can be made to reflect a unique intensity, amplitude or wavelength of light. As described above in relation to FIGS. 4A-E, the distal end 412 can have unique surface including a pattern, color, or some combination thereof to control the way that light is reflected off of the distal end 412. The surface of the component connector 410 can be used to distinguish the model and acoustical characteristics of the component 400. In addition to controlling the surface of the component connector, the length and shape of the component connector 410 can also be varied to affect the intensity, amplitude or wavelength of light reflected from the component connector 410 of the component 400. The surface of the component connector 410 can be constructed as described herein such that the light reflected therefrom has a predetermined intensity. Additionally, the reflected light can have a predetermined amplitude. Furthermore, the reflected light can have a predetermined wavelength. In other embodiments, a predetermined combination of intensity, amplitude, and wavelength can be desired.

While the illustrated component 400 is an audio headset with two drivers 404 and one microphone 408, other audio headsets are considered within the scope of this disclosure. In other embodiments, the audio headset can have only a pair of drivers 404 or a single audio driver 404. Additionally in one example, the drivers 404 can be intraconcha headsets configured to fit over the ear with the audio driver 404 fitting loosely on the entrance of the user's ear-canal. In another example, the audio driver 404 can also be inserted firmly in the user's ear canal to establish a tighter seal between the audio driver 404 and the user's ear canal. In yet another embodiment, the audio driver 404 can be a supra-aural headset that encompasses the entire ear of the user. Each of these different types of headsets can exhibit different audio properties. According to the present disclosure, the audio headset that is attached the electronic device can be determined from the component connector 410. These different audio headsets can exhibit different properties depending on a variety of factors including the seal with the ear canal, driver size, and driver configuration. For instance, circumaural headsets are designed to completely encompass the ears and result in relatively low degree of sound leakage. Supra-aural headsets have pads that sit on top of the ears and allow for a greater degree of sound leakage. In order to optimize the quality of sound received and transmitted from a given audio headset with unique acoustical characteristics, the audio settings of the electronic device 300 can be adjusted. The electronic device 300 can store the different profiles associated with the corresponding audio headset and modify device settings based upon the sensed component.

Additionally, the manufacturer of the headset can configure the headset with specific uses and properties. For example, some headsets can be designed to increase the bass sensed by the user of the headset. In other applications, a consistent mid-range headset is desirable. As described herein, the electronic device can identify the component based upon the light reflected off of the component connector and modify at least one setting of the electronic device in response to the detection. For example, if a manufacturer wants the treble, bass, and mid-range to be adjusted to certain respective levels, the electronic device can adjust settings to these levels. In another embodiment, the user can set the desired settings for the audio headset as well. While the above examples have been described in relation to components which are audio headsets, other components such as microphones, keyboards, displays, projectors, and the like are also considered within the scope of this disclosure. Each of these components can be identified using the method and systems as described herein.

Figure 7:
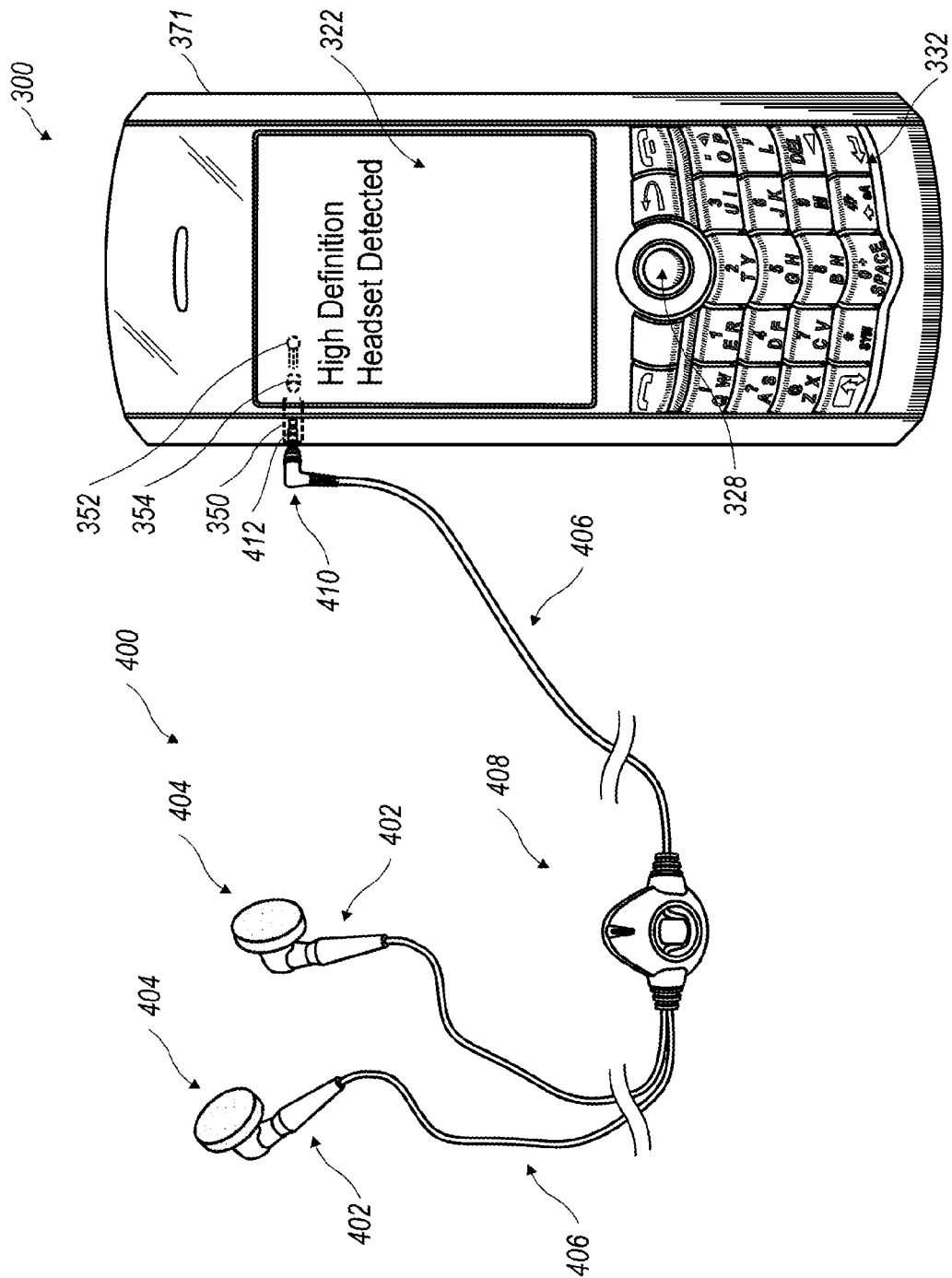
FIG. 7 illustrates an audio headset coupled to an example handheld electronic device according to the present disclosure.

As shown in FIG. 7, a light source 352 of the electronic device 300 is configured to emit light into the receiving socket 350. Light emitted from the light source 352 is reflected off the distal end 412 of the component connector 410 when the distal end 412 of the component connector 410 is inserted into the receiving socket 350 of the electronic device 300. Light can be automatically emitted from the light source 352 into the receiving socket 350 when the distal end 412 of the component connector 410 is inserted into the receiving socket 350. In at least one other embodiment, the user can initiate emission of light from the light source 352 into the receiving socket 350 by actuating a predetermined key 140, illustrated in FIG. 1, on the body 371 of the device 300, executing a voice command, or actuating a user-selectable target image on a touch-sensitive display of the device 300, and the like. In one embodiment, the light source 352 is a light emitting diode (LED) or backlight provided for lighting the display 322 of the electronic device 300.

As shown in FIG. 7, a light sensor 354 is configured along the path of light reflected from the distal end 412 of the component connector 410. The light sensor 354 is coupled to a processor 338 and is equipped to sense the intensity of light reflected from the distal end 412 of the component connector 410. The intensity of light reflected from the distal end 412 of the component connector 410 can vary based on the surface of the distal end 412 as described above.

As illustrated in FIG. 7, the light sensor 354 can be a photo sensor that converts the intensity of light reflected from the distal end 412 of the male component connector 410 into a digital signal that is input to the processor 338 of the handheld electronic device 300. Memory 324 is coupled to the processor 338 and stores a look-up table of known light intensity profiles corresponding to a color spectrum and corresponding to a plurality of components 400 with individual characteristics and associated device settings. For example, when the component is an audio headset the processor 338 can identify the model and acoustical characteristics of the audio headset inserted into the receiving socket 350 based on the intensity of light reflected from the distal end 412 and sensed by the photo sensor 354. In order to optimize the quality of sound transmitted and received from the audio headset, the processor 338 modifies at least one setting of the electronic device 300 in response to the identification and acoustical characteristics of the audio headset.

Audio settings of the electronic device 300 that can be modified include one of a treble setting, a bass setting, a mid-range setting, a volume setting, a balance setting or any other audio setting modification contemplated by one of ordinary skill in the art capable of improving the sound quality received or transmitted through the audio headset.

In another example embodiment, the light source 352 is a laser configured within the receiving socket 350 to emit light into the receiving socket 350 of the electronic device 300. The implementation of a laser can be similar to that as described above. In addition, if the laser is enabled through a predetermined key 140, the laser can be emitted from the receiving socket and function as a pointer on the electronic device 300.

In at least one embodiment, the light sensor 354 can be configured to sense the wavelength of light reflected from the distal end 412 of the component connector 410. The light sensor 354 can be coupled to the processor 338 of the handheld electronic device 300 and converts the wavelength of light reflected from the distal end 412 of the component connector 410 into a digital signal that is input to the processor 338. The wavelength of light reflected from the distal end 412 of the component connector 410 can vary as described above. Memory 324 is coupled to the processor 338 and stores a look-up table of known wavelength profiles corresponding to a component. Therefore, the processor 338 can identify the model and characteristics of the component 400 inserted into the receiving socket 350 based on the wavelength of light reflected from the distal end 412 and sensed by the light sensor 354. In order to optimize the quality of sound transmitted and received from the audio headset 400, the processor 338 modifies at least one setting of the electronic device 300 in response to the identification of the component 400.

In another alternative embodiment, the light sensor can be configured to sense the amplitude of light reflected from reflected from the distal end 412 of the component connector 410. The light sensor 354 can be coupled to the processor 338 of the handheld electronic device 300 and converts the amplitude of light reflected from the distal end 412 of the component connector 410 into a digital signal that is input to the processor 338. The amplitude of light reflected from the distal end 412 of the component connector 410 can vary as described above. Memory 324 is coupled to the processor 338 and stores a look-up table of known amplitude profiles corresponding to a component. Therefore, the processor 338 can identify the model and characteristics of the component 400 inserted into the receiving socket 350 based on the amplitude of light reflected from the distal end 412 and sensed by the light sensor 354. In order to optimize the quality of sound transmitted and received from the audio headset 400, the processor 338 modifies at least one setting of the electronic device 300 in response to the identification of the component 400.

Figure 8:
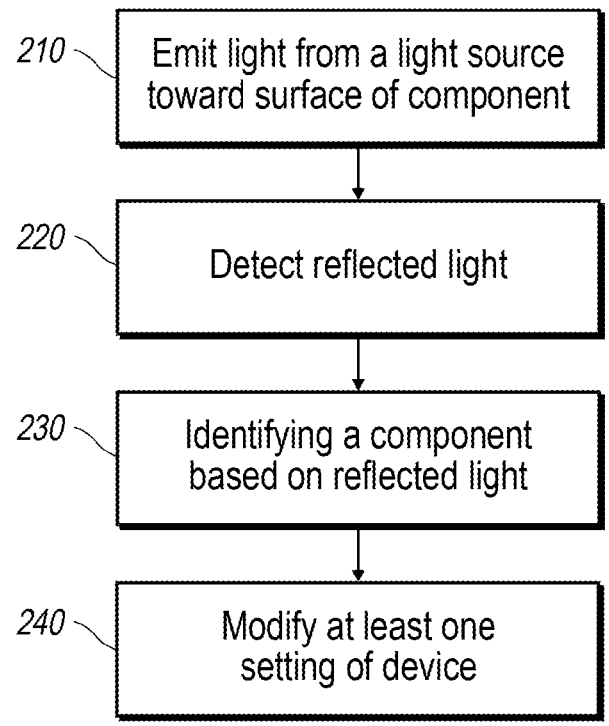
FIG. 8 illustrates an example of a method according to the present disclosure.

An exemplary method is illustrated in FIG. 8. As illustrated the method emits light from a light source and the emitted light is directed toward a surface of a component connector inserted into a receiving socket of a handheld electronic device. (Block 210). Additionally, the method also detects reflected light, using a light sensor, from the surface of the component connector. (Block 220). The method further identifies a component based on the reflected light off of the component connector. (Block 230). Then, the method modifies at least one setting of the handheld electronic device in response to the identification of the component. (Block 240). The identification of the component can be based upon at least one of the detected amplitude of the reflected light, the detected wavelength of the reflected light, and the detected intensity of the reflected light. The identification of the connected component can be either pre-stored in memory of the handheld electronic device or it may be user programmed for instance after coupling the component. The memory can sort the identification of the component and associated settings along with the associated sensed reflected light. The surface of the component connector can be as described above. For example, the surface of the component connector can be a colored surface. In at least another example, the surface of the component connector can be a predetermined texture comprising one of granular and smooth.

Figure 9:
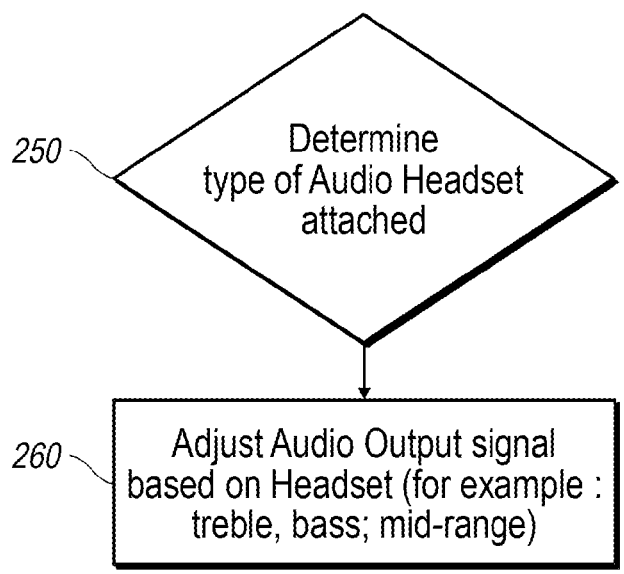
FIG. 9 illustrates an exemplary determination of an audio headset and modification of device settings.

As illustrated in FIG. 9, once the determination of the type of audio headset is made (Block 250), the processor adjusts audio output signals to the headset based on the attached headset (Block 260). For example, the at least one setting that is adjusted can be one of a treble setting, a bass setting and a mid-range setting. If another type of component is connected as described above, a similar determination can be made and appropriate settings can be modified in response to the identification of the component.

In other embodiments, the memory 324 of the electronic device 300 can store a series of look-up tables containing a profile of reflected light intensities, wavelengths or light amplitudes corresponding to the texture, length, shape or composition of matter of any surface of the component connector 410. Therefore, it is contemplated that the method herein disclosed can identify the model and characteristics of the component 400 based on the texture, length, shape or composition of matter of at least one surface of the component connector 410 of the component 400. Furthermore, the light sensor 354 of the present application can be a fiber-optic sensor, photovoltaic sensor, a photo-resistive sensor or any other sensor contemplated by one of ordinary skill in the art capable of sensing the intensity, amplitude or wavelength of light reflected from at least one surface of the component connector 410 of the component 400.

Example embodiments have been described hereinabove regarding the implementation of a method and system for identifying the model and characteristics of a component coupled to an electronic device. Various modifications to and departures from the disclosed example embodiments will occur to those having skill in the art. The subject matter that is intended to be within the spirit of this disclosure is set forth in the following claims.

What is claimed is:

1. A component-connector for connecting a component to an electronic device, the component-connector being insertable into a receiving socket of the electronic device and comprising a distal end having a light-reflective surface, the reflective surface having at least one identifying characteristic rendering it identifiable by the device, wherein the at least one identifying characteristic comprises a diameter of the reflective surface.

2. The component-connector of claim 1, wherein the at least one identifying characteristic further comprises at least one color.

3. The component-connector of claim 1, wherein the at least one identifying characteristic further comprises a predetermined texture.

4. The component-connector of claim 1, wherein the at least one identifying characteristic further comprises a color and a predetermined texture.

5. The component-connector of claim 3, wherein the predetermined texture is a series of raised bumps.

6. The component-connector of claim 2, wherein the color is a dark color.

7. The component-connector of claim 1, wherein the component is an audio headset.

8. The component-connector of claim 1, wherein the component is a display screen.

9. The component-connector of claim 1, wherein the component is an input device.

10. A component-connector for connecting a component to an electronic device, the component-connector being insertable into a receiving socket of the electronic device and comprising a distal end having a light-reflective surface, the reflective surface having at least one identifying characteristic rendering it identifiable by the device, wherein the component is a keyboard.

11. A component-connector for connecting a component to an electronic device, the component-connector being insertable into a receiving socket of the electronic device and comprising a distal end having a light-reflective surface, the reflective surface having at least one identifying characteristic rendering it identifiable by the device, wherein the component is a touch pad.

12. A component-connector for connecting a component to an electronic device, the component-connector being insertable into a receiving socket of the electronic device and comprising a distal end having a light-reflective surface, the reflective surface having at least one identifying characteristic rendering it identifiable by the device, wherein the component is a speaker.

13. A component-connector for connecting a component to an electronic device, the component-connector being insertable into a receiving socket of the electronic device and comprising a distal end having a light-reflective surface, the reflective surface having at least one identifying characteristic rendering it identifiable by the device, wherein the component is an audio sound system.

14. A component-connector for connecting a component to an electronic device, the component-connector being insertable into a receiving socket of the electronic device and comprising a distal end having a light-reflective surface, the reflective surface having at least one identifying characteristic rendering it identifiable by a light source housed within the device, wherein the at least one identifying characteristic comprises a diameter of the reflective surface.

15. The component-connector of claim 14, wherein the at least one identifying characteristic further comprises at least one color.

16. The component-connector of claim 14, wherein the at least one identifying characteristic further comprises a predetermined texture.

* * * * *